US007020666B2

(12) United States Patent
Doise et al.

(10) Patent No.: US 7,020,666 B2
(45) Date of Patent: Mar. 28, 2006

(54) SYSTEM AND METHOD FOR UNKNOWN TYPE SERIALIZATION

(75) Inventors: Caleb L. Doise, Bellevue, WA (US); Gopalakrishna R. Kakivaya, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 10/383,666

(22) Filed: Mar. 7, 2003

(65) Prior Publication Data
US 2004/0177080 A1  Sep. 9, 2004

(51) Int. Cl.
*G06F 17/30* (2006.01)
(52) U.S. Cl. ...................... 707/203; 707/101
(58) Field of Classification Search ............... 707/100, 707/101, 203; 235/375; 709/203, 246; 714/25; 717/170; 719/328
See application file for complete search history.

(56) References Cited

U.S. PATENT DOCUMENTS

2003/0191803 A1* 10/2003 Chinnici et al. ............ 709/203

OTHER PUBLICATIONS

Dr. Heinz M. Kabutz,Serializing Objects Into Database, May 2000, pp. 1-4.*
Dare Obasanjo, XML Serialization in the .NET Framework, Jan. 2003, pp. 1-8.*

* cited by examiner

*Primary Examiner*—Apu Mofiz
(74) *Attorney, Agent, or Firm*—Woodcock Washburn LLP (57) ABSTRACT

A method of serializing and deserializing unknown data types in a strongly typed model. The method includes serializing an object to a data stream at first node and communicating the data stream to a second node. The second node may be another process, machine or a file on a disk. The data stream is deserialized at a later time, and the data types within the data stream are determined. Objects are instantiated in accordance with known data types, and unknown objects are created to retain information related to each unknown data type in the data stream. These unknown objects are used to regenerate the unknown data type when a serialization operation is performed at the second node on an unknown object.

9 Claims, 3 Drawing Sheets

SYSTEM AND METHOD FOR UNKNOWN TYPE SERIALIZATION

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright© 2003, Microsoft Corporation, All Rights Reserved.

FIELD OF THE INVENTION

This invention relates in general to the field of distributed systems and frameworks. More particularly, this invention relates to a system and method of serialization of object data that also provides for the serialization of unknown data types in a strongly typed model.

BACKGROUND OF THE INVENTION

The process of serialization is the converting of an object or a connected graph of objects, stored within computer memory, and conventionally drawn on paper in two dimensions, into a linear encoded sequence of bytes. The basic idea of serialization is that an object should be able to write its current state, usually indicated by the value of its member variables, to persistent storage. The linear encoded bytes contain all of the information that was contained in the starting objects. That sequence of bytes may be used in several ways. For example, the sequence may be sent to another process on the same machine to construct arguments to a method that is run in another process. The sequence may be sent to the clipboard to be browsed or included in another application, sent "down the wire" to another machine to create a clone on that machine of the original object graph, or sent to a file on-disk so that it can be reused later.

The Microsoft .NET Framework accomplishes serialization by reflecting upon the object graph to generate a linear encoding (e.g., such as XML or .NET Binary Format). Reflection allows the dynamic discovery of fields and properties for a given Common Language Runtime (CLR) type. Using reflection it is possible to retrieve the values of fields and properties from an object instance. Furthermore, reflection enables the developer to discern a type's inheritance hierarchy.

Deserialization is the process of taking the linear encoded representation of an object graph and re-hydrating the representation into an in-memory representation. The linear encoding contains a type description for each object in the graph. This type description is read and correlated with a CLR type. This CLR type is then instantiated and the data members are populated through reflection. By combining deserialization and serialization it is possible to transmit in-memory objects between endpoints in a distributed system.

Strongly-typed models are those where each type of data (e.g., integer, character, hexadecimal, packed decimal, user-defined types, etc.) is predefined within a type system that can be checked at compile-time by the compiler of a programming language (i.e., C/C++, C#, etc.) and all constants or variables defined for a given program must be described with one of the data types. A problem that often occurs within strongly typed models is that not all types are present on all nodes in the network. This problem could result because either the type is completely unknown or has been extended in a future version which is not available when deserializing the graph.

Thus, in view of the foregoing, there is a need for systems and methods that overcome the limitations and drawbacks of the prior art. In particular, there is a need to handle unknown types in a strongly typed distributed programming model. Further, there is a need for versioning and extensibility mechanisms in distributed models to allow different versions of systems to interoperate. The present invention provides such a solution.

SUMMARY OF THE INVENTION

The present invention is directed to serializing and deserializing unknown data types in a strongly typed model. In accordance with an aspect of the invention, there is provided a method of deserializing a data stream. The method includes receiving the data stream, determining data types within the data stream, instantiating objects in accordance with known data types, and creating an unknown object to retain information related to an unknown data type in the data stream. The unknown object is used to regenerate the unknown data type when a reserialization operation is performed on the unknown object.

In accordance with a feature of the invention, the deserialization process determines completely unknown objects, which do not have a known base class. The present invention also determines the most-refined known base class of the unknown data type from the deserialization context, and if base class deserialization is allowed, assigns the most-refined known base class to the unknown data type while still retaining information related to the unknown fields of the encountered actual type for use during reserialization.

According to another aspect of the invention, there is provided a method of serializing objects to a data stream at a node where at least one of the object types is unknown to the node. The method includes mapping between the programming language types and an XML Schema, creating an instance of an output stream, and if an object type was previously known to the node, then it is mapped to the XML schema from the object's class to the output stream. If the object type was not previously known by the node, then it is mapped to the XML schema from an unknown object to reconstitute the data stream received by the node as the output stream.

According to another aspect of the invention, there is provided a method for communicating serialized data between nodes in a distributed system having a strongly typed model. The method includes serializing an object to the data stream at first node, communicating the data stream to a second node, deserializing the data stream at the second node, determining data types within the data stream, instantiating objects in accordance with known data types, and creating an unknown object to retain information related to an unknown data type in the data stream. The unknown object is used to regenerate the unknown data type when a reserialization operation is performed at the second node on the unknown object.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The present invention is directed to systems and methods that provide full-featured search capabilities to Internet businesses, without necessitating the design and implementation of their own search facility.

Exemplary Computing Environment

Figure 1:
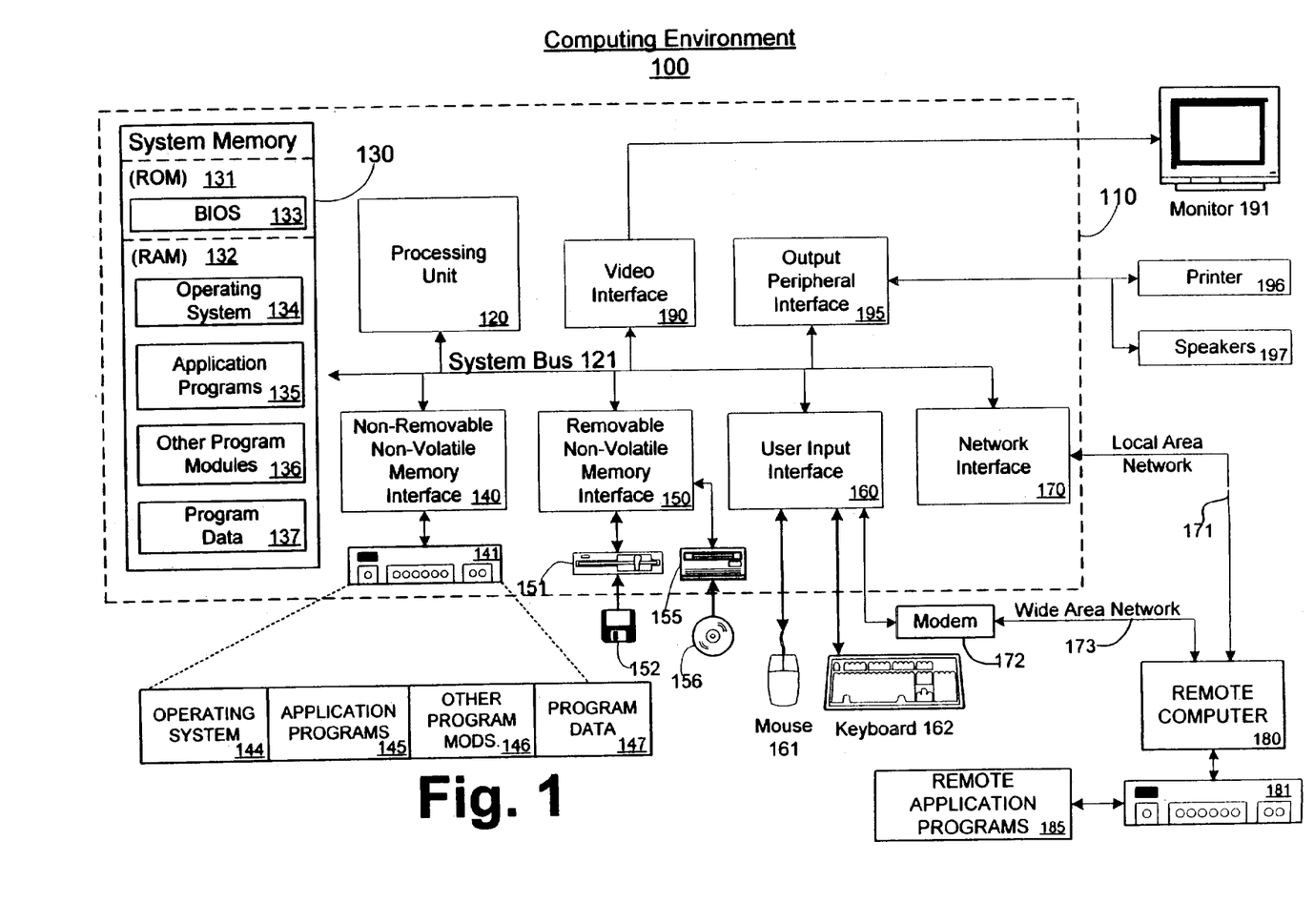
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Framework and Architecture Overview

The serialization model of present invention advantageously enables a serialization engine to gracefully handle unknown types in a strongly-typed model. The serialized stream may be encoded in XML, a compact binary representation, SOAP, etc. Those of ordinary skill in the art would recognize that serialization of objects transforms object data into a stream. The present invention takes advantage of the fact that the runtime metadata knows all field and property definitions for each object's layout in memory. Thus, it is possible to serialize objects automatically, without having to write code to serialize each field.

As used herein, a "type" describes a CLR type, and defines a data contract for a memory structure and methods which operate over the data. It is noted that the present invention is not limited to CLR types and can be extended to other runtime programming types. Types may extend other types through inheritance. For example, when type B extends type A, B acquires the data, properties, and methods from A. By virtue of inheritance, types can extend each other in a hierarchical fashion. In accordance with the present invention, if an unknown type is encountered, an error is not generated and the application is allowed to determine that it has encountered an unknown object and is free to use its known and unknown fields as deemed appropriate at run time. There are two forms of unknown types: completely unknown types and unknown types where one of the base classes is known. This behavior enables the creations of intermediaries who are unaware of the types and do not interact with them. The intermediaries only need to be able to pass the objects on to another endpoint.

Below is an example of how to perform serialization of a graph of objects having a root arraylist l to a FileStream. In accordance with the present invention, Serialization can take place with any stream (e.g., MemoryStream, NetStream, etc.), and is not limited to a FileStream.

```
class SerializeExample{
public static void Main(String[] args)
{
   ArrayList l = new ArrayList();
   for (int x=0; x< 100; x++) {
      l.Add (x);
   }                                                  // create the object graph
   FileStream s = File.Create("foo.bin");             // create the filestream
   BinaryFormatter b = new BinaryFormatter();         // create the
                                                      BinaryFormatter
   b.Serialize(s, l);                                 // serialize the graph to
                                                      the stream
} // end main
} // end class
```

This next code then goes on to creates a clone of the graph by deserializing it. The root of the clone graph is called p:

```
using System;
using System.IO;
using System.Collections;
using System.Serialization;
using System.Serialization.Formatters.Binary;
class DeSerialize{
public static void Main(String[] args)
{
   FileStream s = File.Open("foo.bin");              // open the filestream
   BinaryFormatter b = new BinaryFormatter();        // create the formatter
   ArrayList p = (ArrayList) b.Deserialize(s);       // deserialize
   p.ToString();                                     // print out the new
                                                     object graph
} // end Main
} // end Class DeSerialize
```

As noted above, a problem occurs when unknown types are serialized in a strongly typed distributed programming model. The present invention advantageously overcomes this limitation of the prior art by deserializing an unknown type in the XML (or binary) stream as the most refined known CLR type available. The invention also provides a process for including Unknown Type information, which allows the original XML (or binary) data to be generated when the object is reserialized. The invention thus enables distributed systems to be implemented in a robust and strongly typed manner because if an unknown type is encountered, deserialization may be performed and an error is not generated, and the application is allowed to determine that it has encountered an unknown object and is free to use its known and unknown fields as deemed appropriate at run time.

In accordance with the present invention, there are two forms of unknown types: (1) "completely unknown types" and (2) "unknown types." Instances of "completely unknown types" are preferably represented with the UnknownObject class (described below). The UnknownObject contains the XML type of the object and the serialized fields as a list of name-value pairs. It may also contain additional information that may be needed to regenerate the same XML when serializing the UnknownObject once again. "Unknown types" are those where the base class is known, but however, the actual type of the object is unknown. In this case, the present invention assigns the base class to the unknown type and retains unknown fields in an UnknownSubType field of the class (described below). The UnknownSubType contains the information necessary to reserialize the unknown types into their original XML.

Consider the following example of a client requesting a song from a remote server. The server may know about the types PlayCommand and Song.

```
[SBSerializable]
public class PlayCommand
{
    public Song RequestedSong;
}
[SBSerializable,
 SBType(AllowBaseClassDeserialization=true)]
public class Song
{
    [SBUnknownSubType]
    protected UnknownSubType subTypeInfo;
    public string Title;
}
```

In this example, however, the client is running a newer version of the software, and it will send a SongEx instance as the RequestedSong field in the PlayCommand to request a particular song to be played. SongEx is defined as follows:

```
[SBSerializable,
 SBType(AllowBaseClassDeserialization=true)]
public class SongEx : Song
{
    public string Album;
}
```

When the server tries to deserialize a request from this client, it will determine that the RequestedSong field is occupied by a type called SongEx, which it does not know about. However, the server does know that the field is to be of type Song, and Song has been marked to indicate that it is acceptable to deserialize unknown types as the base class.

As such, the deserialization engine will instantiate a Song and populates the known fields. It will also package up the unknown fields and unknown type name into an UnknownSubType object and assign it to the field decorated with SBUnknownSubTypeAttribute which in this case is the subTypeInfo field of the Song type. If the server ever reserializes the Song instance with the unknown type info, the serialization engine will use the UnknownSubType field to regenerate the original XML.

Figure 2:
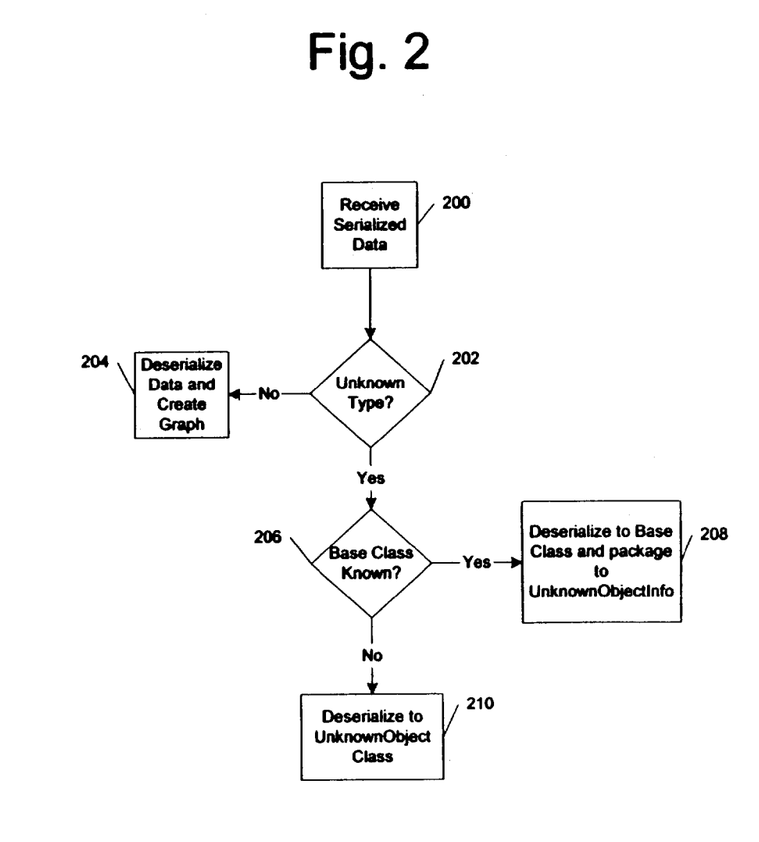
FIG. 2 is a flow chart of the deserialization process of the present invention.

FIG. 2 is a flow chart illustrating the operation of the deserialization process of the present invention. At step 200, serialized data is received by a node. At step 202 it is determined if the received type is unknown. If not, then at step 204, the datastream is deserialized and the object represented thereby is instantiated. If the type is unknown at step 202, then at step 206, it is determined if a base class of the unknown type is known and if base deserialization is allowed. If so, then at step 208, the unknown type is deserialized to a known base class and the unknown fields and unknown type name are packaged to an UnknownSubType object. If there is no base class for the unknown type at 206, then at step 210 the type is deserialized to an UnknownObject object. The process is repeated until all the objects in the input stream have been deserialized. The result is an object graph in which some nodes might be represented by Unknown objects.

Referring back to the previous example, if Song does not allow base class deserialization, PlayCommand would be responsible for handling the unknown type. As such, the service is not able to convert the unknown SongEx into a Song, and an UnknownObject is created. Since the RequestedSong field is typed as a Song, the server would not be able to assign the UnknownObject to it. An unassignable field instance typically results in the deserialization operation failing. However, the PlayCommand may be rewritten to prevent this problem. For example, a first option is to use an Object field with an attribute specifying the actual type.

```
[SBSerializable]
public class PlayCommand
{
    [SBField(
        XmlElementName="RequestedSong",
        ActualType=typeof(Song))]
    private Object _song;
    public Song RequestedSong
    {
        get { return (Song)_song; }
    }
}
```

In this case, a failure will not occur until an application attempts to retrieve the RequestedSong property. An invalid cast exception will be realized for trying to convert an UnknownObject into a Song. Of course, the above PlayCommand can be enhanced to gracefully handle the UnknownObject by looking for the "title" field and using it to play the requested song.

Another option is to provide a tracking field for unassignable types. In this case, when the server cannot assign an UnknownObject to the Song property, it will track the value within the FieldTrackingInfo field. When reserializing the object, the server will check FieldTrackingInfo for a value if the RequestedSong is null.

```
[SBSerializable]
public class PlayCommand
{
    [SBFieldTrackingInfo]
    protected FieldTrackingInfo FieldTrackingInfo;
    public Song RequestedSong;
}
```

In all the above cases, the published XML contract for PlayCommand remains the same.

Figure 3:
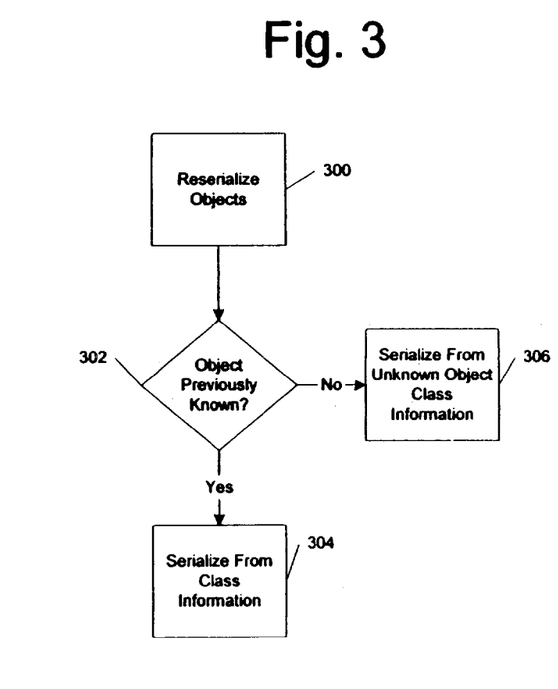
FIG. 3 is a flow chart of the serialization process of the present invention.

Referring to FIG. 3, to reserialize object including unknown objects, the present invention maps from the programming language constructs to, e.g., an XML Schema. An XML serializer maps between the CLR type and an XML Schema type (step 300). If an object type was previously known (step 302), the type is mapped to the XML schema from the object's class (step 304). If the object was not previously known, then the unknown aspects of the type is mapped to an instance of the UnknownSubType class or, if completely unknown, the UnknownObject class. Thus, unknown types encountered during the deserialization process can be reserialized to the original XML data stream in accordance with data preserved in UnknownObject and UnknownSubType.

The object classes implemented in present invention to handle the serialization of unknown types will now be discussed. It is noted that the objects described below are provided for exemplary purposes and are not intended to limit the scope of the present invention.

1. TypeHierarchy

TypeHierarchy is a class that holds a list of all types in the class hierarchy. This information is used to allow the deserializer to instantiate the most derived type for which it has an implementation.

```
public abstract class TypeHierarchy
{
    public abstract XsdQName[] Hierarchy { get; }
}
```

Hierarchy is a list of the types in the XML type hierarchy sorted from the most refined down to the base class that is an immediate child of CLR Object type (XSD anyType).

2. UnknownSubType

UnknownSubType is used for storing additional type information and unknown fields when deserializing an unknown type as a known base class. When a class indicates that it allows base class deserialization, it has a field of type UnknownSubType marked with the SBUnknownSubType-Attribute.

```
public abstract class UnknownSubType
{
    public abstract XsdQName ActualType { get; }
    public abstract TypeHierarchy Hierarchy { get; }
    public abstract int FieldCount { get; }
    public abstract UnknownField GetField(int index);
    public abstract UnknownField GetField(
        string fieldName);
}
```

ActualType is the actual type of the object. This may be null if the actual type of the object could not be determined from the deserialized stream. Hierarchy stores the full type hierarchy of the object if the type hierarchy information was included when the instance was serialized. Normally, the property will be null indicating that no such information is needed. FieldCount returns the number of unknown fields present. GetField(int index) returns an unknown field given its index. GetField(string fieldName) returns an unknown field given its name.

3. UnknownObject

UnknownObject holds the state for objects of a completely unknown type.

```
public abstract class UnknownObject
{
    public abstract XsdQName ActualType { get; }
    public abstract TypeHierarchy Hierarchy { get; }
    public abstract int FieldCount { get; }
    public abstract UnknownField GetField(int index);
    public abstract UnknownField GetField(
        string fieldName);
}
```

The fields of the UnknownObject type are similar to that noted above with regard to UnknownSubType type.

4. UnknownField

UnknownField holds the state for an unknown field.

```
public abstract class UnknownField
{
    public abstract string Name { get; }
    public abstract Object Value { get; set; }
    public abstract bool includeActualType { get; set; }
    public abstract bool IsSingleRef { get; set; }
}
```

Name is the name of the unknown field. This name is encoded to be an XML element name. Value is the value of the unknown field. Field includeActualType, if true, means that the xsi:type (see, XML Schema Part 0: Primer, XML Schema Part 1: Structures, and XML Schema Part 2: Datatypes, W3C Recommendations, 2 May 2001, which are incorporated herein by referenced in their entireties) attribute must be included on the serialized element with this value. IsSingleRef indicates whether the field should be serialized as a single-reference element (see, Simple Object Access Protocol (SOAP) 1.1, W3C Note, 08 May 2000, which is incorporated herein by reference in its entirety).

5. UnknownPrimitiveValue

Within unknown types in a graph, the actual type of an unknown field can be either a simple-type (primitive) or a complex-type. The two cases are distinguished from the fact that simple-type has its value encoded as text values whereas complex-type has one or more sub-elements to represent the values of its fields. Thus, it can be inferred that the deserialization process recurses for complex-types with the recursion bottoming out when all the encountered fields are of simple-type. The type of simple-type field will not be known unless the element is decorated with an xsi:type attribute. For example, it is not possible to know whether a simple-type field is an integer or a string when using XML as the serialization format. Simple-type values whose type cannot be determined are stored as an UnknownPrimitiveValue instance which will appear as the Value property on an UnknownField.

```
public class UnknownPrimitiveValue
{
    XsdQName ActualType { get; }
    public string Value { get; }
}
```

6. PossibleQNameValue

For some unknown values, it is possible that they might be a QName. In order to properly reserialize the XML data, the XML namespace and prefix that would apply if the unknown value happens to actually be a QName must be retained. This requires special handling because it is the only XML type whose actual value is dependent on the containing XML document.

```
public class PossibleQNameValue : UnknownPrimitiveValue
{
    public string Prefix { get; }
    public string Namespace { get; }
}
```

7. UnknownArray

Arrays of unknown types require special handling and are represented with the UnknownArray class.

```
public abstract class UnknownArray
{
    public abstract XsdQName ElementType { get; }
    public abstract int Rank { get; }
    public abstract int GetSize(int dimension);
    public abstract void SetValue(Object obj, int index);
    public abstract void SetValue(
        Object obj, int[] indices);
    public abstract Object GetValue(int index);
    public abstract Object GetValue(int[] indices);
}
```

ElementType is the element type of the array. Rank is the number of dimensions in the array. GetSize(int dimension) Returns the size of the specified dimension. SetValue(Object obj, int index) Sets the array value at the specified index. SetValue(Object obj, int[ ] indices) sets the array value at the specified indices. GetValue(int index) gets the array value at the specified index. GetValue(int[ ] indices) gets the array value at the specified indices.

8. UnknownJaggedArray

UnknownJaggedArray represents a jagged array with an unknown base type. The "values" of this array will be the child arrays.

```
public abstract class UnknownJaggedArray : UnknownArray
{
    public abstract int ChildLevels { get; }
    public abstract int GetChildLevelRank(int index);
}
```

ChildLevels indicates the number of child levels in the array. GetChildLevelRank(int index) returns the rank of the jagged array at the given child level.

Figure 4:
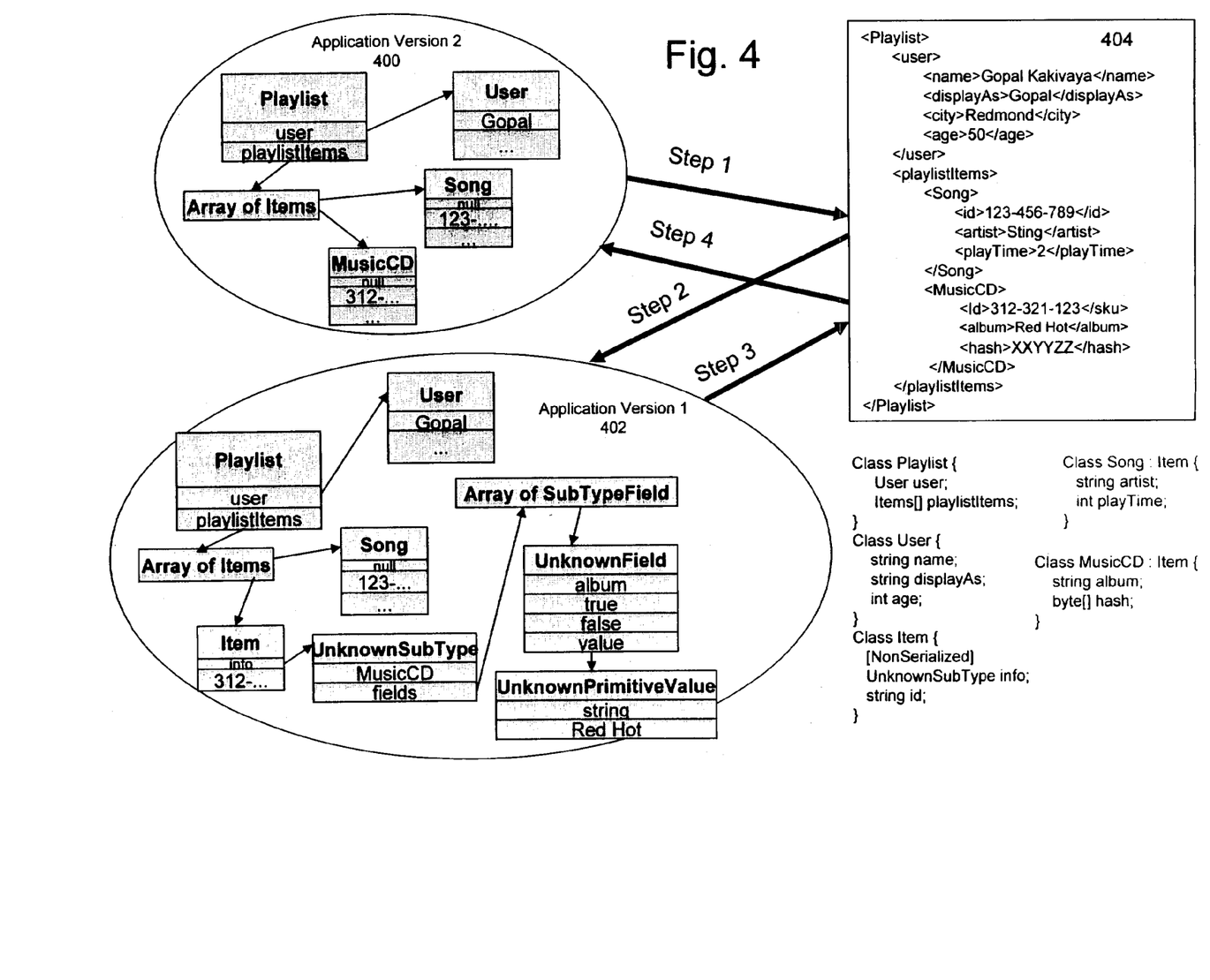
FIG. 4 illustrates the serialization/deserialization process of the present invention wherein the endpoints of the process are of differing versions.

FIG. 4 illustrates an exemplary embodiment of the present invention wherein two endpoints 400 and 402 are running different versions of an operating system. In the exemplary embodiment, endpoint 400 is a newer version than endpoint 402. When the object graph illustrated at endpoint 400 is serialized (Step 1) the resulting XML data 404 is generated. The XML data 404 is the forwarded to endpoint 402 and deserialized (Step 2). As illustrated, the endpoint 402 does not know about certain types (e.g., MusicCD). As such, it deserializes the unknown subtype MusicCD into appropriate unknown classes (UnknownSubType, UnknownField, UnknownPrimitiveValue). It is noted that FIG. 4 that the UnknownField instance associated with the "hash" field of the "Class MusicCD" is not illustrated. This field is stored in memory, however, not shown in the Fig. for the sole purpose of simplifying the Fig. In accordance with the present invention, when the endpoint 204 reserializes the object graph (Step 3), the XML data 404 can be recreated. If necessary, this can be deserialized (Step 4) at the endpoint 400 into the original object graph that was serialized at Step 1.

As has been described above, the present invention through its unique deserialization/serialization method, enables intermediaries that typically lack knowledge of the types being exchanged by the endpoints to be placed in between them. It also enables different versions of endpoints that have evolved independently to interoperate.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, may be applied to a serialization format other than XML, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for communicating serialized data between nodes in a distributed system having a strongly typed model, comprising:
    serializing an object to the data stream at first node;
    communicating the data stream to a second node;
    deserializing the data stream at the second node;
    determining data types within the data stream;
    instantiating objects in accordance with known data types; and
    creating unknown objects to retain information related to unknown data types in the data stream, said unknown objects being used to regenerate retained information when a serialization operation is performed at the second node on said unknown objects.

2. The method of claim 1, further comprising determining completely unknown objects, said completely unknown objects being objects not having a known base class.

3. The method of claim 2, further comprising retaining a type hierarchy of the unknown object and a number of unknown fields.

4. The method of claim 1, further comprising determining a base class of said unknown data type, and if base class deserialization is allowed, assigning said base class to said unknown data type.

5. The method of claim 4, further comprising retaining a type hierarchy of the unknown object and a number of unknown fields.

6. The method of claim 1, wherein said determining data types includes determining XML element names.

7. The method of claim 6, wherein said determining data types includes determining XML QNames.

8. The method of claim 1, wherein the data stream comprises one of a filestream, netstream, or memorystream.

9. The method of claim 1, further comprising determining unknown arrays.

* * * * *